US011722576B2

(12) United States Patent
Fan et al.

(10) Patent No.: US 11,722,576 B2
(45) Date of Patent: Aug. 8, 2023

(54) CONTENT DISPLAY BASED ON USER RELATIONSHIP

(71) Applicant: INTERNATIONAL BUSINESS MACHINES CORPORATION, Armonk, NY (US)

(72) Inventors: Si Bin Fan, Beijing (CN); Wu Song Fang, Beijing (CN); Xing Xing Jing, Beijing (CN); Xiao Ying Zhou, Beijing (CN); Bin Xiong, Beijing (CN); Ting Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 16/188,708

(22) Filed: Nov. 13, 2018

(65) Prior Publication Data

US 2020/0153933 A1  May 14, 2020

(51) Int. Cl.
*H04L 67/306* (2022.01)
*G06Q 50/00* (2012.01)

(52) U.S. Cl.
CPC .......... *H04L 67/306* (2013.01); *G06Q 50/01* (2013.01)

(58) Field of Classification Search
CPC .............................. G06Q 50/01; H04L 67/306
See application file for complete search history.

(56) References Cited

U.S. PATENT DOCUMENTS

| 8,166,069 | B2 | 4/2012 | Sample et al. | |
| 9,064,235 | B2 | 6/2015 | Yuki | |
| 2012/0078957 | A1* | 3/2012 | Galbreath | H04L 67/10 707/769 |
| 2012/0290635 | A1* | 11/2012 | Yuki | H04L 51/32 709/202 |
| 2014/0074923 | A1* | 3/2014 | Vasudevan | G06F 21/10 709/204 |
| 2015/0058419 | A1* | 2/2015 | Tai | G06Q 50/01 709/204 |
| 2017/0104759 | A1* | 4/2017 | Li | H04L 63/104 |
| 2017/0286423 | A1* | 10/2017 | Shorman | G06F 16/248 |
| 2018/0060439 | A1* | 3/2018 | Kula | G06Q 30/06 |

FOREIGN PATENT DOCUMENTS

CN      106789552 A    5/2017

OTHER PUBLICATIONS

S. Agarwal, K. K. Dhara and V. Krishnaswamy, "Profile sharing recommendation system for enterprise collaboration," 9th IEEE International Conference on Collaborative Computing: Networking, Applications and Worksharing, 2013, pp. 400-408, doi: 10.4108/icst.collaboratecom.2013.254076 (Year: 2013).*

(Continued)

*Primary Examiner* — Gabrielle A McCormick
*Assistant Examiner* — Maame Ofori-Awuah
(74) *Attorney, Agent, or Firm* — Anthony Curro

(57) ABSTRACT

A first content and a second content of a first user are obtained. The second content is configured by the first user to be displayed to a second user instead of the first content. A familiarity degree between the first user and the second user are determined. A third content is generated based on the first content, the second content, and the familiarity degree. The third content is displayed to the second user.

21 Claims, 5 Drawing Sheets

(56) References Cited

OTHER PUBLICATIONS

Balsiger, Peter W., Szabo, Balazs, "Context based social network profile picture," IP.com No. IPCOM000239764D Dec. 2014, pp. 1-8 (Year: 2014).*

Disclosed Anonymousley, "Method and System for Displaying Profile Picture Based on Designated Social Associatio", IP.com No. IPCOM000219544D, Jul. 5, 2012, pp. 1-5.

Mell et al., "The NIST Definition of Cloud Computing", National Institute of Standards and Technology, Special Publication 800-145, Sep. 2011, pp. 1-7.

* cited by examiner

CONTENT DISPLAY BASED ON USER RELATIONSHIP

FIELD

The present invention relates to information processing, and more specifically, to methods, systems and computer program products for content display based on user relationship.

BACKGROUND

In many social network applications, a user may set up a profile to distinguish the user from other users. Contents comprised in the profile of the user can be displayed to other users (such as, friends of the user, etc.).

SUMMARY

According to one embodiment of the present invention, there is provided a computer-implemented method for content display. According to the method, a first content and a second content of a first user are obtained. The second content is configured by the first user to be displayed to a second user instead of the first content. Familiarity degree between the first user and the second user are determined. A third content is generated based on the first content, the second content, and the familiarity degree. Then, the third content is displayed to the second user.

According to another embodiment of the present invention, there is provided a computer system for content display. The computer system comprises a processor, a computer-readable memory coupled to the processor. The computer-readable memory comprises instructions that when executed by the processor perform actions of: obtaining a first content and a second content of a first user, wherein the second content is configured to be displayed to a second user instead of the first content; determining familiarity degree between the first user and the second user based on interaction history between the first user and the second user; generating a third content based on the first content, the second content, and the familiarity degree; and displaying the third content to the second user.

According to another embodiment of the present invention, there is provided a computer program product for content display. The computer program product comprises a computer readable storage medium having program instructions embodied therewith, the program instructions executable by a processor to cause the processor to perform actions of: obtaining a first content and a second content of a first user, wherein the second content is configured to be displayed to a second user instead of the first content; determining familiarity degree between the first user and the second user based on interaction history between the first user and the second user; generating a third content based on the first content, the second content, and the familiarity degree; and displaying the third content to the second user.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
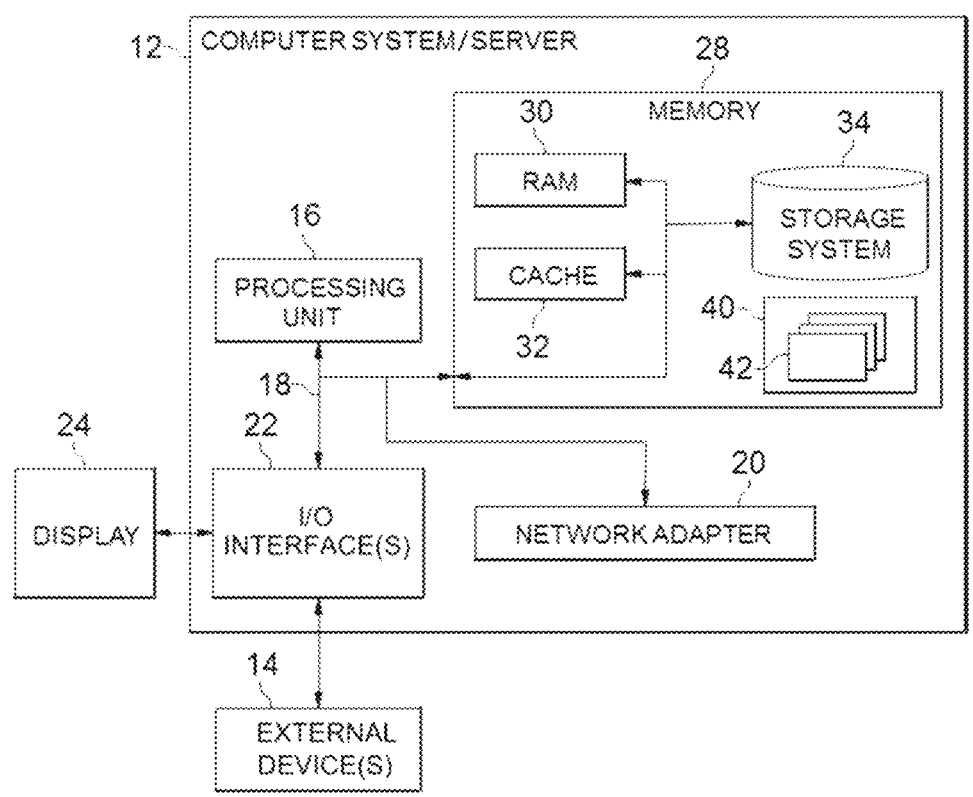
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
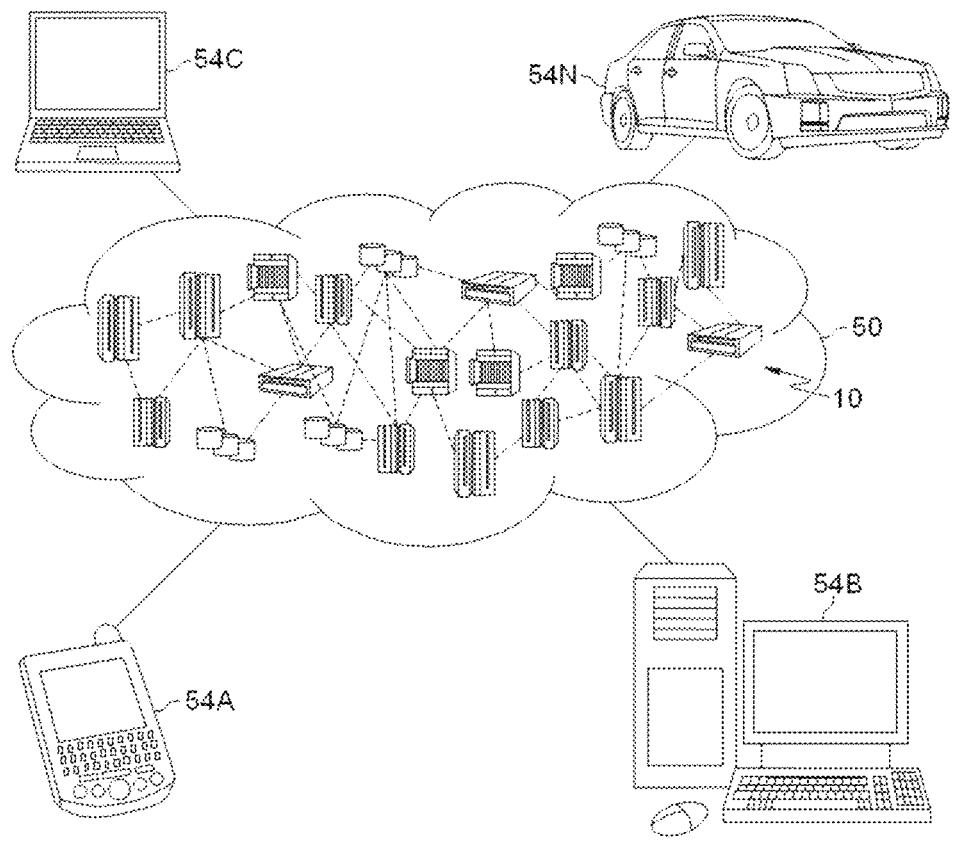
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
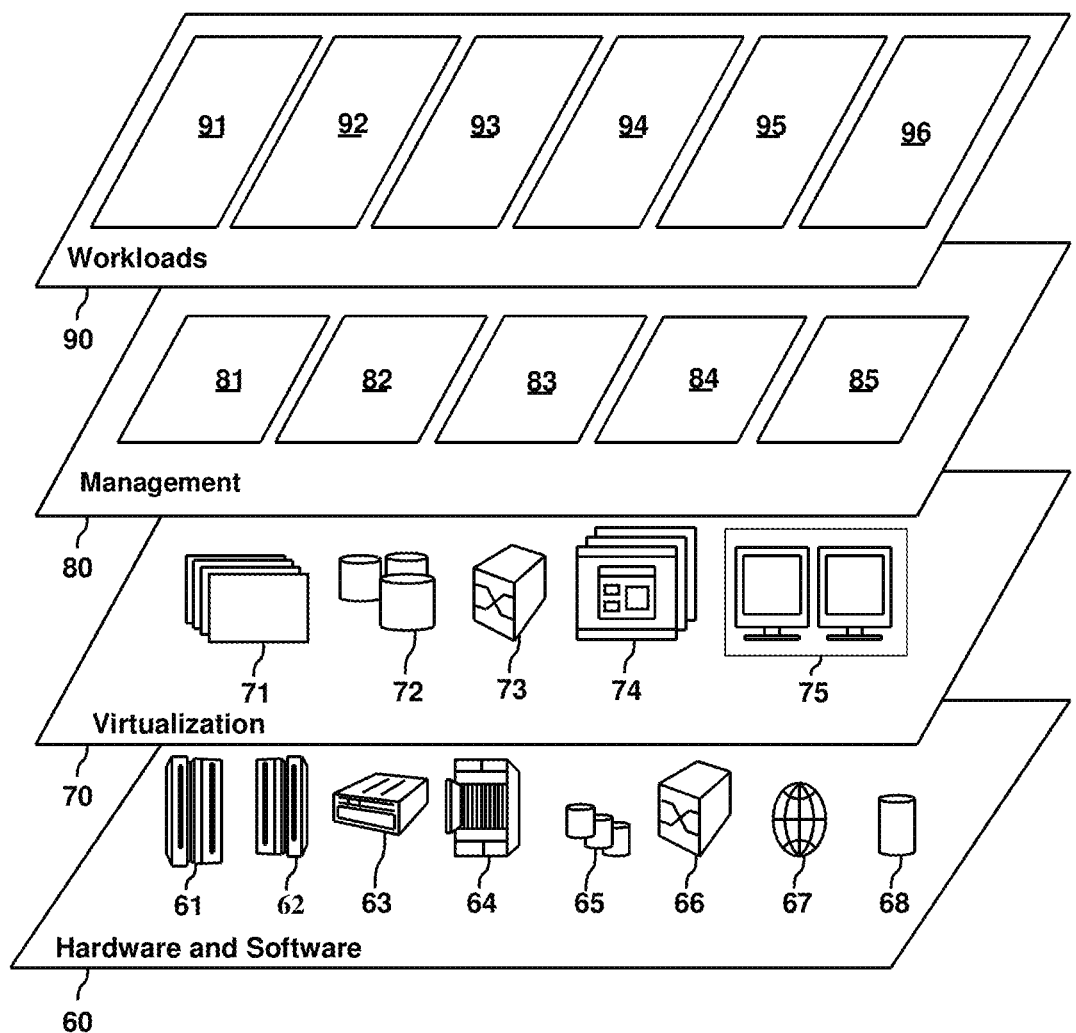
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content display 96.

Figure 4:
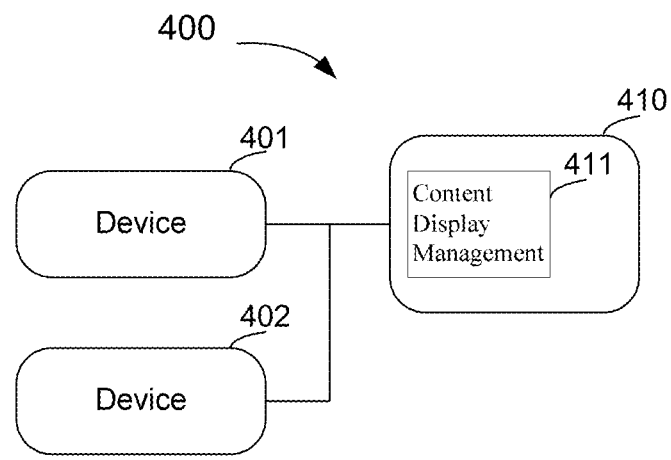
FIG. 4 depicts a schematic diagram of an example network system according to an embodiment of the present invention.

With reference now to FIG. 4, a schematic diagram of an example network system 400 according to an embodiment of the present invention is illustrated. The network system 400 comprises a server (for example, server 410) providing a social network service now known or to be developed. In some embodiment, server 410 can be computer system/server 12 of FIG. 1.

A user may set up a profile on a social media network, communication application (e.g., chat or email), or other application to distinguish the user from other users. Some or all of the content included in the profile of the user may be displayed to other users (such as, friends of the user, etc.) of the application. Content included in the profile of the user may include a screen name, nick name, image, avatar, or other identifying information. However, if the user changes his or her profile without informing the other users, or informs the other user and they forget, the other users may not recognize or associate the new profile with the user, and thus have trouble in finding the right user according to the new profile. Advantageously, embodiments of the present invention provide a technological improvement to known social media networks, communication applications, or other applications. The improvement may permit other users to recognize or associate a new profile with the user in situations where the other users are not informed or forget that the user has adopted new content for their profile.

As an example, user A uses device 401 to access the social network service provided by server 410 via a communication link between device 401 and server 410 (for example, a network link, etc.), and user B uses device 402 to access the social network service via a link between device 402 and server 410. It shall be understood that user A and user B are used to describe principles of the invention, and more than two users can access the social network service provided by server 410. User A configures a profile to distinguish user A from other users of the social network services. The profile of user A may comprise a user name, a nick name, an avatar, a gif, a signature, and/or other information now known or to be developed that can be used to identify user A, etc. It shall be understood that the profile may comprise contents less or more than the contents listed above. The profile can be stored in server 410, and other users can also access the profile. In this example, user B can access the profile of user A. For example, some contents comprised in the profile of user A can be obtained from server 410 and displayed on device 402 of user B, and then user B can distinguish user A based on these displayed contents.

Figure 5:
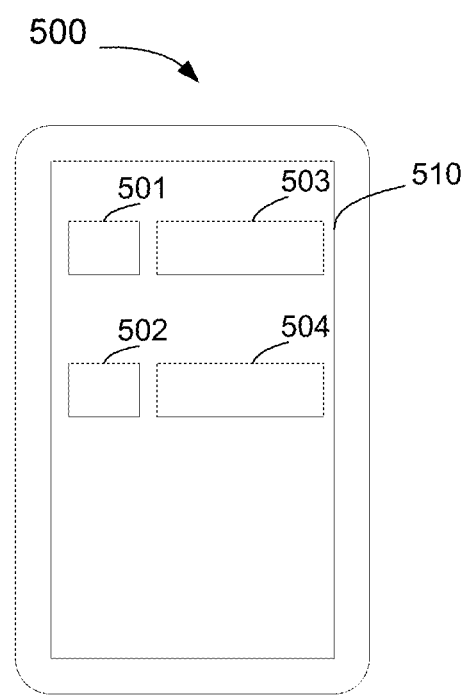
FIG. 5 depicts a schematic diagram of an example device according to an embodiment of the present invention.

With reference now to FIG. 5, a schematic diagram of an example device 500 according to an embodiment of the present invention is illustrated. Device 500 can be an example of device 401 or device 402. Device 500 may comprise a display screen 510. Content 501 and content 502 (such as, avatars of two users) comprised in profiles of the users can be displayed on display screen 510. As an example, content 501 and content 502 can be displayed respectively besides message 503 and message 504 sent by each of the users.

In some embodiments, device 500 is used by user B, and content 501 can correspond to the profile of user A. Content 501 may comprise a user name, a nick name, an avatar, a signature, and/or other information now known or to be developed that can be used to identify user A, etc.

User A may update the profile of user A. For example, user A may update a user name, a nick name, an avatar, a signature, etc. comprised in the profile. If user A does not notify user B after the updating of the profile, it is hard for user B to associate the new profile with user A, and thus having trouble in finding the right user according to the new profile. For example, if the current avatar of user A is updated to a new avatar, and the new avatar of user A is displayed as content 501 on device 500 of user B, it is hard for user B to determine the sender of message 503.

Embodiments of the invention provide a method, computer system, and computer program product for display contents comprised in profiles of users.

According to embodiments of the invention, if user A updates a current content comprised in the profile with a new content, the content to be replaced and the new content can both be obtained by content display management module 411. For the sake of brevity, the content to be replaced will be referred as a first content, and the new content will be referred as a second content hereinafter. In some embodiments, the timestamp when the first content is configured, by user A, to be replaced by the second content can also be recorded by server 410.

According to embodiments of the invention, a familiarity degree between user A and user B can be determined by content display management module 411. The familiarity degree is used to represent the familiarity between user A and user B.

In some embodiments, interaction history between user A and user B before the updating of the profile by user A can be obtained, and the familiarity degree between user A and user B can be determined based on the obtained interaction history. The interaction history may comprise interactions between A and B of one or more types in one or more periods before the updating of the profile. The interaction history can be obtained from server 410, device 401, or device 402, etc.

In some embodiments, the familiarity degree can be determined based on the count of interactions between A and B in a preset period. As an example, the familiarity degree can be directly proportional to the count. A lager count of interactions between user A and user B may mean user B is more familiar with user A, and the familiarity degree between user A and user B will be higher. The interactions may comprise message chatting, viewing or commenting of text, image, video materials published by user A, and/or swiping or clicking on displayed contents of the profile, etc. It shall be understood that other type of interactions between user A and user B can also be used to determine the familiarity degree. As an example, sending a message by user A in a chat group including user A and user B can be thought as a kind of message chatting between user A and user B.

In some embodiments, the period may be a preset period. The preset period can be set by user A, user B and/or server 410. For example, the preset period can be the latest 24 hours before the updating of the profile by user A. In an example, if user B chats with user A in the latest 24 hours before updating the content, the count is 1 and the familiarity degree can also be determined as 1. In another example, if user B chats with user A in the latest 24 hours and comments on materials published by user A before the updating, the count is 2 and the familiarity degree can also be determined as 2.

In some other embodiments, one or more counts of one or more types of interactions between user A and user B can be determined based on the interaction history, and the familiarity degree can be determined based on the one or more counts. As an example, the familiarity degree can be determined as a sum of the one or more counts. As a further example, the familiarity degree can be directly proportional to the sum of the one or more counts.

As a further example, weights can be assigned to the one or more counts of interactions according to the types of the interactions. The familiarity degree can be determined based on the counts in the one or more periods and corresponding weights. For example, the familiarity degree can be determined as: $F=\Sigma_{i=1}^{n} k_i * Count_i$, wherein F is the familiarity degree, n is the number of types of interactions, $Count_i$ is the count of interactions of type i, and $k_i$ is the weight of count of interactions of type i.

Table 1 is an example of counts and corresponding weights assigned for each type of interactions. There are three types of interactions (message chatting, viewing or commenting of materials published by user A, and swiping or clicking on a displayed content of the profile of user A) in Table 1. In the example of Table 1, the familiarity degree can be a score determined as follows: 1*0.3+0*0.2+1*0.5=0.8. It shall be understood that the types of interactions, counts of each type of interaction, and weights for each type of interaction in Table 1 are used to describe principles of the invention, any suitable types and weights for different types of interactions can be applied. The types and corresponding weights can be set by server 410 and/or updated according feedbacks from users of network system 400.

TABLE 1

| Period | Type of Interaction | Count of Each Type of Interaction | Weight for Each Type of Interaction |
|---|---|---|---|
| Latest 24 hours | message chatting | 1 | 0.3 |
| Latest 24 hours | viewing or commenting of materials published by user A | 0 | 0.2 |
| Latest 24 hours | swiping or clicking on the displayed content of the profile | 1 | 0.5 |

As a further example, counts of interaction of one or more types in one or more periods between user A and user B can be determined based on the interaction history, and weights can also be assigned to the counts of interaction of the one or more types for the one or more periods. A count of interactions of the one or more types in a period can be determined using the above-mentioned methods. The familiarity degree can be determined based on the counts in the one or more periods and corresponding weights. For example, the familiarity degree can be determined as: $F=\sum_{i=1}^{m} p_i * Count_i$, wherein F is the familiarity degree, m is the number of periods, $Count_i$ is the count in the period i, and $k_i$ is the weight assigned to the count in the period i. In this example, a weight assigned to a count in a period, which is more recent than another period, can be larger than a weight assigned to a count in the another period.

Table 2 is an example of counts and corresponding weights. There are three periods in Table 2. In the example of Table 2, the familiarity degree can be a score determined as follows: 1*0.5+2*0.3+1*0.2=1.3. It shall be understood that the periods, counts, and weights in Table 2 are used to describe principles of the invention, any suitable periods (including lengths of the periods and number of the periods) and weights can be applied, and counts in each period can be determined based on the interaction history. The periods and corresponding weights can be set by server 410 and/or updated according feedbacks from users of network system 400.

TABLE 2

| Period | Count of Interactions in Each Period | Weight for Each Period |
|---|---|---|
| Latest 24 hours (including 24 hours) | 1 | 0.5 |
| Latest 24-48 hours (including 48 hours) | 2 | 0.3 |
| Latest 48-72 hours (including 72 hours) | 1 | 0.2 |

In some embodiment, a transition period ($T_{transition}$) can be calculated by content display management module 411 based on the familiarity degree. As an example, the transition period can be in inverse proportion to the familiarity degree. A larger familiarity degree between user A and user B may mean user B is more familiar with user A, so the transition period can be shorter. The transition period can be calculated using a mapping table between the familiarity degree and transition periods. The mapping table can be set by server 410 and/or updated according feedbacks from users of network system 400. Table 3 is an example mapping table. For example, in Table 3, if the familiarity degree is smaller than 0.5, the transition period will be 3 days. It shall be understood that the transition periods provided in Table 3 are used to describe principles of the invention, any suitable transition periods can be applied.

TABLE 3

| Familiarity Degree (F) | Transition Period |
|---|---|
| F ≤ 0.5 | 3 days |
| 0.5 < F ≤ 1 | 2 days |
| F > 1 | 1 day |

According to embodiments of the invention, a third content can be generated based on the first content, the second content, and the familiarity degree by content display management module 411.

For example, if the first content is current avatar of user A, and the second content is a new avatar of user A to replace the current avatar, the third content can be generated based on the current avatar, the new avatar, and the familiarity degree. The generated third content can be a picture comprising elements of the current avatar and the new avatar.

In some embodiment, if the familiarity degree between user A and user B is smaller than a threshold, the third content is generated. If the familiarity degree between user A and user B is larger than or equal to the threshold, the third content will not be generated, and the second content will replace the first content directly. The threshold can be set by server 410 and/or updated according feedbacks from users of network system 400.

In some embodiments, a first area and a second area in the third content can be determined based on the familiarity degree, and the first content and the second content can be mapped respectively to the first area and the second area in the third content. For example, sizes, and/or formats of the first area and the second area can be determined based on the familiarity degree. As an example, the size and/or format of the first area can be in inverse proportion to the familiarity degree, and the size and/or format of the second area can be in direct proportion to the familiarity degree. A lager familiarity degree between user A and user B may mean user B is more familiar with user A, so the size and/or format of the first area can be smaller, and the size and/or format of the second area can be larger. Table 4 is an example mapping table between sizes, and/or formats of the first area and the second area and the familiarity degree. It shall be understood that Table 4 is used to describe principles of the invention, and any other suitable mapping table can also be applied. The mapping can be set by server 410 and/or updated according feedbacks from users of network system 400.

TABLE 4

| Familiarity Degree (F) | Size, and/or format of the first area | Size, and/or format of the second area |
|---|---|---|
| F ≤ 0.5 | 60% of the size of third content, Large Font Size | 40% of the size of third content, Small Font Size |
| 0.5 < F ≤ 1 | 40% of the size of third content, Small Font Size | 60% of the size of third content, Large Font Size |
| F > 1 | N/A | 100% of the size of third content, Large Font Size |

As a further example, the size of the third content (S) can be set by server 410 and/or updated according to feedbacks from users of network system 400, such as 100*100 pixels, etc. If the familiarity degree is small than the threshold (for example, the familiarity degree is 1.2 and the threshold is 2), the size of the first area $S_1$ can be set as S*(1−familiarity degree/threshold) (such as, 40*40 pixels), and the size of the second area $S_2$ can be set as S*familiarity degree/threshold (such as, 60*60 pixels).

In some other embodiments, the time amount ($T_{passed}$) passed since the second content being configured can be determined. A first area and a second area in the third content can be determined based on the time amount ($T_{passed}$) and the transition period ($T_{transition}$). The first content and the second content can be mapped respectively to the first area and the second area in the third content.

Sizes, and/or formats of the first area and the second area can be determined based on the time amount and the transition period. As an example, the size and/or format of the first area can be in inverse proportion to $T_{passed}$, and the size and/or format of the second area can be in direct proportion to $T_{passed}$. For example, the size of the first area can be set as:

$$S_1 = S * \left(1 - \frac{T_{passed}}{T_{transition}}\right),$$

wherein $S_1$ is the size of first area, S is the size of the third content. The size of the second area can be set as:

$$S_2 = S * \frac{T_{passed}}{T_{transition}}.$$

In this example, the size of the third content is preset by server 410, such as 120*120 pixels, etc. If the $T_{transition}$ is 3 days and $T_{passed}$ is 2 days, the size of the first area $S_1$ is 40*40 pixels, and the size of the second area $S_2$ is 80*80 pixels.

Figure 6:
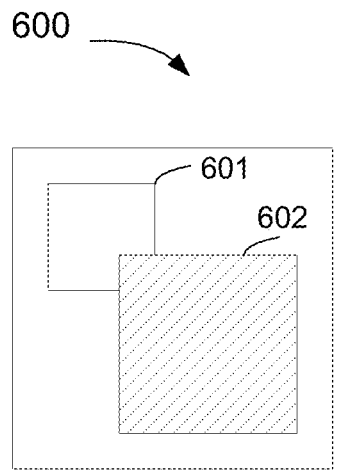
FIG. 6 depicts a schematic diagram of an example content according to an embodiment of the present invention.

With reference now to FIG. 6, a schematic diagram of an example content 600 according to an embodiment of the present invention is illustrated. Content 600 is an example of the third content, and comprises an area 601 and an area 602. The first content (for example, the current avatar of user A to be replaced) can be mapped to area 601 and the second (for example, the new avatar of user A) can be mapped to area 602 using existing technologies. For example, some pixels in the current avatar can be copied to area 601 to form a thumbnail of the current avatar, and some pixels in the new avatar can be copied to area 602 to form a thumbnail of the new avatar.

According to embodiments of the invention, the generated third content can be displayed to user B.

In some embodiment, the third content is generated by a content display management module 411, the third content can be sent by content display management module 411 to device 402 or a display device of user B, and the third content can be displayed on a screen of device 402 or the display device. For example, content 600 in FIG. 6 can be displayed to user B on the screen of device 402.

In some other embodiment, the third content (for example, content 600) can be generated by a module comprised in device 402, and the third content can be displayed on the screen of device 402.

In some embodiments, a transition period based on the familiarity degree is calculated by content display management module 411. Content display management module 411 checks whether the transition period is expired. If the transition period is not expired, the generated third content can be displayed to user B. If the transition period is expired, the second content will be displayed to user B instead the third content.

As a further example, the familiarity degree between user B and user A can be updated based on interactions between user A and user B during the transition period before the time of updating the familiarity degree. The familiarity degree can be updated to a new value using methods mentioned above. For example, the updated familiarity degree can be determined based on an updated interaction history between user A and user B, which includes interactions between user A and user B before the updating of the content of the profile and the interactions between user A and user B during the transition period before the time of updating the familiarity degree. If the updated familiarity degree is larger than a preset threshold, the second content will be displayed to user B instead of the third content. In this example, the threshold can be set by content display management module 411.

As a further example, during the transition period, device 402 and/or content display management module 411 may detect a user action from user B. If the user action indicates user B acknowledging the second content, the second content will be displayed to user B instead of the third content. For example, an acknowledging option to acknowledge the second content can be provided to user B and displayed on device 402. If user B clicks an icon corresponding to the acknowledging option, this action can be detected by device 402, and a message representing the action can be sent to content display management module 411. Then device 402 or content display management module 411 can control the second content to be displayed to user B instead of the third content.

It should be noted that content display management module 411 may comprise a plurality of sub modules, some of the plurality of sub modules may be comprised in server 410, and some of the plurality of sub modules may be comprised in device 402 and/or device 401. In some other embodiments, the content display management module 411 can be comprised in device 402.

Figure 7:
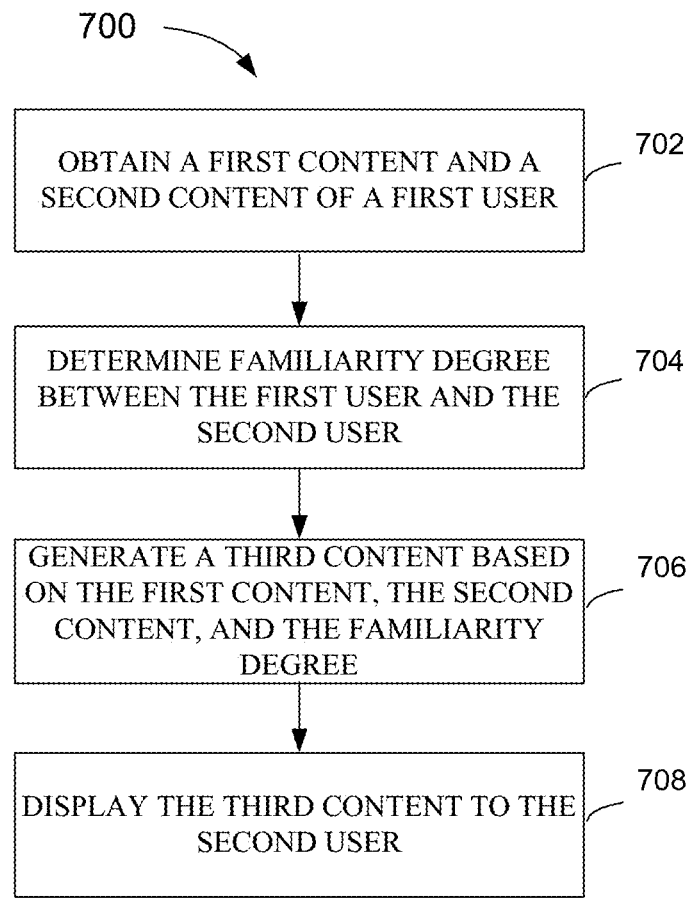
FIG. 7 depicts a flow chart of an example method for displaying contents according to an embodiment of the present invention.

A method 700 for content display according to embodiments of the invention will be discussed with reference to FIG. 7. Method 700 can be implemented by computer system/server 12 of FIG. 1. Method 700 can also be implemented by server 410, device 401, and/or device 402. It shall be noted that method 700 is only illustrative and is not intended to suggest any limitation as to the scope of use or functionality of embodiments of the present invention described herein.

At step 702, a first content and a second content of a first user are obtained. The second content is configured by the first user to be displayed to a second user instead of the first content. At step 704, familiarity degree between the first user and the second user is determined. At step 706, a third content is generated based on the first content, the second content, and the familiarity degree. At step 708, the third content is displayed to the second user.

According to embodiments of the invention, some steps of method 700 can be implemented respectively by device 401, device 402 or server 410.

It should be noted that the processing of user content display according to embodiments of this disclosure can be implemented by computer system/server 12 of FIG. 1.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically displaying a modified user profile of a social networking application user modified by the social networking application user to another social networking application user in the social networking application, the computer-implemented method comprising:

accessing, by one or more processors, a profile of a first social networking application user from a social network service server via a network link between computer devices, the social network service server providing a social networking application to a plurality of social networking application users, the social networking application users of the social networking application including the first social networking application user and a second social networking application user, the profile of the first social networking application user being accessible to the users of the social networking application, the profile of the first social networking application user comprising a first current social networking application content to be replaced and a second new social networking application content, wherein the second new social networking application content is configured to be displayed to the second user instead of and replace the first current social networking application content;

determining, by one or more processors, a familiarity degree between the first social networking application user and the second social networking application user based on interaction history between the first social networking application user and the second social networking application user in the social networking application, wherein the interaction history is based on interactions within the social networking application between the first social networking application user and the second social networking application user, the interactions including selectively one or more of message chatting, viewing of text, commenting on text, text materials published, image materials published, video materials published, swiping on displayed profile contents, and clicking on displayed profile contents;

generating, by one or more processors, a third social networking application content based on the first social networking application content, the second social networking application content, and the familiarity degree, a format of the third social networking application content related to the determined familiarity degree; and displaying automatically, by one or more processors, on a computer display device the third social networking application content in the social networking application to the second social networking application user.

2. The method of claim 1, wherein the determining the familiarity degree comprises:

obtaining, by one or more processors, one or more counts of interactions of one or more types in one or more periods between the first social networking application user and the second social networking application user based on the interaction history; and determining, by one or more processors, the familiarity degree based on the one or more counts.

3. The method of claim 2, wherein the determining the familiarity degree based on the one or more counts further comprises:

assigning, by one or more processors, weights to the one or more counts based on the types or the one or more periods; and determining, by one or more processors, a score based on the one or more counts and the weights assigned to the one or more counts to represent the familiarity degree.

4. The method of claim 1, further comprising:

calculating, by one or more processors, a transition period based on the familiarity degree, and wherein the displaying the third social networking application content to the second social networking application user comprises displaying, by one or more processors, the third social networking application content to the second social networking application user during the transition period.

5. The method of claim 4, further comprising:

in response to detecting an action from the second social networking application user during the transition period, displaying, by one or more processors, the second social networking application content to the second social networking application user, wherein the action indicates the second social networking application user acknowledging the second social networking application content.

6. The method of claim 4, further comprising:

updating, by one or more processors, the familiarity degree based on the interactions between the first social networking application user and the second social networking application user during the transition period; and in response to the updated familiarity degree being larger than a preset threshold, displaying, by one or more processors, the second social networking application content to the second social networking application user.

7. The method of claim 1, wherein the generating the third social networking application content comprises:

determining, by one or more processors, a first area and a second area in the third social networking application content based on the familiarity degree; and mapping, by one or more processors, the first social networking application content and the second social networking application content respectively to the first area and the second area in the third content.

8. The method of claim 1, further comprising:

calculating, by one or more processors, a transition period based on the familiarity degree, and wherein the generating the third social networking application content comprises:

determining, by one or more processors, a time amount passed since the second social networking application content being configured;

determining, by one or more processors, a first area and a second area in the third social networking application content based on the time amount and the transition period; and mapping, by one or more processors, the first social networking application content and the second social networking application content respectively to the first area and the second area in the third social networking application content.

9. The method of claim 8, wherein sizes or formats of the first area and the second area are determined based on the time amount and the transition period.

10. The method of claim 1, wherein the first social networking application content and the second social networking application content respectively comprise at least one of the following: user names, nick names, avatars, and signatures.

11. The method of claim 1, wherein the displaying the third social networking application content to the second social networking application user comprises:
sending, by the server, the third social networking application content to the device of the second social networking application user.

12. The method of claim 1, wherein the first social networking application content includes selectively one or more of the following: a screen name, a nick name, an image, and an avatar.

13. A system for automatically displaying a modified user profile of a social networking application modified by the social networking application user to another social networking application user in the social networking application, the system comprising:
one or more processors;
a computer-readable memory coupled to the one or more processors, the computer-readable memory comprising instructions that when executed by the one or more processors perform actions of:
accessing a profile of a first social networking application user from a social network service server via a network link between computer devices, the social network service server providing a social networking application to a plurality of social networking application users, the social networking application users of the social networking application including the first social networking application user and a second social networking application user, the profile of the first social networking application user being accessible to the social networking application users of the service, the profile of the first social networking application user comprising a first current social networking application content to be replaced and a second new social networking application content, wherein the second new social networking application content is configured to be displayed to the second social networking application user instead of and replace the first current social networking application content;
determining a familiarity degree between the first social networking application user and the second social networking application user based on interaction history between the first social networking application user and the second social networking application user in the social networking application, wherein the interaction history is based on interactions within the social networking application between the first social networking application user and the second social networking application user, the interactions including selectively one or more of message chatting, viewing of text, commenting on text, text materials published, image materials published, video materials published, swiping on displayed profile contents, and clicking on displayed profile contents;
generating a third social networking application content based on the first social networking application content, the second social networking application content, and the familiarity degree, a format of the third social networking application content related to the determined familiarity degree; and
displaying automatically on a computer display device the third social networking application content to the second social networking application user.

14. The system of claim 13, wherein the determining the familiarity degree comprises:
obtaining one or more counts of interactions of one or more types in one or more periods between the first social networking application user and the second social networking application user based on the interaction history; and
determining the familiarity degree based on the one or more counts.

15. The system of claim 13, wherein the actions further comprise:
calculating a transition period based on the familiarity degree, and
wherein the displaying the third social networking application content to the second social networking application user comprises displaying the third social networking application content to the second social networking application user during the transition period.

16. The system of claim 13, wherein the generating the third content comprises:
determining a first area and a second area in the third social networking application content based on the familiarity degree; and
mapping, by the one or more processors, the first social networking application content and the second social networking application content respectively to the first area and the second area in the third social networking application content.

17. The system of claim 13, wherein the actions further comprise:
calculating a transition period based on the familiarity degree, and wherein the generating the third social networking application content comprises:
determining, by the one or more processors, a time amount passed since the second social networking application content being configured;
determining, by the one or more processors, a first area and a second area in the third social networking application content based on the time amount and the transition period; and
mapping, by the one or more processors, the first social networking application content and the second social networking application content respectively to the first area and the second area in the third content.

18. A computer program product for automatically displaying a modified social networking application user profile of a social networking application user modified by the social networking application user to another social networking application user in the social networking application, the computer program product comprising a computer readable storage medium having program instructions embodied therewith, the program instructions executable by a processor to cause the processor to perform actions of:
accessing a profile of a first social networking application user from a social network service server, the social network service server providing a social networking application to a plurality of social network users via a network link between computer devices, the users of the social networking application including the first social networking application user and a second social networking application user, the profile of the first social networking application user being accessible to the users of the social network networking application, the profile of the first social networking application user comprising a first current social networking application content to be replaced and a second new social networking application content, wherein the second social networking application content is configured to be displayed to the second user instead of and replace the first current social networking application content;

determining a familiarity degree between the first social networking application user and the second social networking application user based on interaction history between the first social networking application user and the second social networking application user in the social networking application, wherein the interaction history is based on interactions within the social networking application between the first user and the second user, the interactions including selectively one or more of message chatting, viewing of text, commenting on text, text materials published, image materials published, video materials published, swiping on displayed profile contents, and clicking on displayed profile contents;

generating a third social networking application content based on the first social networking application content, the second social networking application content, and the familiarity degree, a format of the third social networking application content related to the determined familiarity degree; and displaying automatically the third social networking application content on a computer display device to the second social networking application user.

19. The computer program product of claim 18, wherein the determining the familiarity degree comprises:

obtaining one or more counts of interactions of one or more types in one or more periods between the first social networking application user and the second social networking application user based on the interaction history; and determining the familiarity degree based on the one or more counts.

20. The computer program product of claim 18, wherein the actions further comprise:

calculating a transition period based on the familiarity degree, and wherein the displaying the third social networking application content to the second social networking application user comprises displaying the third social networking application content to the second social networking application user during the transition period.

21. The computer program product of claim 18, wherein the generating the third content further comprises:

determining a first area and a second area in the third content based on the familiarity degree; and mapping, by the processor, the first social networking application content and the second social networking application content respectively to the first area and the second area in the third content.

* * * * *